US006376418B1

(12) United States Patent
Shamshoum et al.

(10) Patent No.: US 6,376,418 B1
(45) Date of Patent: Apr. 23, 2002

(54) PROCESS AND CATALYST FOR PRODUCING POLYOLEFINS HAVING LOW MOLECULAR WEIGHT

(75) Inventors: Edwar S. Shamshoum, Houston; B. Raghava Reddy, Baytown; Margarito Lopez, Pasadena, all of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/559,775

(22) Filed: Apr. 27, 2000

Related U.S. Application Data

(62) Division of application No. 08/635,274, filed on Apr. 19, 1996, now Pat. No. 6,114,480.

(51) Int. Cl.[7] .................................................. B01J 31/00
(52) U.S. Cl. ..................... 502/152; 526/160; 526/943; 526/127; 526/170
(58) Field of Search .............................. 526/160, 943, 526/127, 170; 502/152

(56) References Cited

U.S. PATENT DOCUMENTS 5,321,107 A * 6/1994 Tsutsui et al. .............. 526/138
5,329,031 A * 7/1994 Miyake et al. .............. 526/160
5,741,868 A * 4/1998 Winter et al. ............... 526/160

FOREIGN PATENT DOCUMENTS

EP        0 537 130        * 4/1993

OTHER PUBLICATIONS

Miyake et al., "Highly Isospecific Polymerization of Propylene with Unsymmetrical Metallocene Catalyst", Macromolecules, vol. 28, No. 9, (1995).*

* cited by examiner

*Primary Examiner*—David W. Wu
*Assistant Examiner*—Ling-Siu Choi
(74) *Attorney, Agent, or Firm*—Jim D. Wheelington

(57) ABSTRACT

The invention provides a metallocene catalyst for use in preparing polyolefins having low molecular weight. The catalyst comprises a bridged metallocene in which one of the cyclopentadienyl rings is substituted in a substantially different manner from the other ring. The catalyst comprises a metallocene compound generally described by the formula $R''(C_5R_4)(R'_2C_5C_4R'_4)MeQ_p$ wherein $(C_5R_4)$ is a substituted cyclopentadienyl ring; $(R'_2C_5C_4R'_{4n})$ is an indenyl ring or substituted indenyl ring; each R and R' is hydrogen or hydrocarbyl radical having from 1–20 carbon atoms, a halogen, an alkoxy, and alkoxy alkyl or an alkylamino radical, each R and R' may be the same or different; $(C_5R_4)$ has one R substituent in a distal position which is at least as bulky as a t-butyl radical; R" is a structural bridge between the $(C_5R_4)$ and $(R'_2C_5C_4R'_4)$ rings to impart stereorigidity; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; and p is the valence of Me minus 2.

12 Claims, 2 Drawing Sheets

PROCESS AND CATALYST FOR PRODUCING POLYOLEFINS HAVING LOW MOLECULAR WEIGHT

This is a divisional application of application Ser. No. 08/635,274 filed on Apr. 19, 1996 now U.S. Pat. No. 6,114,480.

BACKGROUND OF THE INVENTION

1. Field of the Invention

The invention relates to a metallocene catalyst useful in preparing polyolefins having low molecular weight and narrow molecular weight distribution. The catalyst comprises a bridged metallocene having two cyclopentadienyl rings, one substituted with a bulky group in a distal position and one substituted such that a fused ring is formed. The invention further includes a process of preparing polyolefins having low molecular weight and narrow molecular weight distribution using the disclosed catalysts. The polymer product can be used as a crystalline wax or a functionalizable macromer formed of a olefin terminated chain.

2. Description of the Prior Art

The present invention provides a process for polymerizing olefins to produce a polymer with a low molecular weight and a narrow molecular weight distribution. The catalyst and process are particularly useful in polymerizing ethylene and propylene to form crystalline waxes or functionalizable macromers having low molecular weight and narrow molecular weight distribution.

Polypropylene may vary by stereochemical structure. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula, the stereochemical sequence of isotactic polypropylene is described as follows:

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

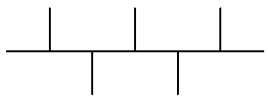

In NMR nomenclature, this pentad is described as . . . rrrr . . . in which each "r" represents a "racemic" dyad, i.e., successive methyl groups on alternate sides of the plane. The percentage of r dyads in the chain determines the degree of syndiotacticity of the polymer. Syndiotactic polymers are crystalline and, like the isotactic polymers, are insoluble in xylene.

Atactic polymer exhibits no regular order of repeating unit configurations in the polymer chain and forms essentially a waxy product.

Catalysts that produce isotactic polyolefins are disclosed in European Patent Application Publication No. 284,708 corresponding to U.S. patent application Ser. No. 034,472 filed Apr. 3, 1987, and now abandoned; U.S. Pat. No. 4,794,096; and European Patent Application Publication No. 310,734 corresponding to U.S. patent application Ser. No. 095,755 filed on Sep. 11, 1987, and now abandoned. These applications disclose chiral, stereorigid metallocene catalysts that polymerize olefins to form isotactic polymers and are especially useful in the polymerization of a highly isotactic polypropylene. The present invention, however, provides a different class of metallocene catalysts that are useful in the polymerization of olefins, and more particularly, ethylene and propylene, to produce a crystalline wax.

SUMMARY OF THE INVENTION

The present invention provides a catalyst and process for preparing crystalline polyolefins having low molecular weight, and more particularly, polyethylene and polypropylene having low molecular weights.

The catalyst comprises a metallocene, i.e., a metal derivative of a cyclopentadiene, and an ionizing agent. The metallocene compound should contain two cyclopentadienyl rings and be of the general formula:

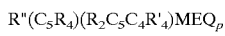

wherein $(C_5R_4)$ is substituted cyclopentadienyl ring; $(R_2C_5C_4R'_n)$ is an indenyl or substituted indenyl ring; each R and R' is hydrogen or hydrocarbyl radical having from 1–20 carbon atoms, a halogen, an alkoxy, and alkoxy alkyl or an alkylamino radical, each R and R' may be the same or different; $(C_5R_4)$ has one R substituent in a distal position which is at least as bulky as a t-butyl radical; R" is a structural bridge between the $(C_5R_4)$ and $(R_2C_5C_4R'_4)$ rings to impart stereorigidity and is preferably a hydrocarbyl or hydrosilyl radical having one atom of carbon or silicon to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; and p is the valence of Me minus 2.

The present invention further provides a process for producing polyolefins, particularly atactic polypropylene of low tacticity, i.e., neither predominantly isotactic or syndiotactic, having low molecular weight and narrow molecular weight distribution. The process comprises utilizing at least one of the catalysts described by the above formula and introducing the catalyst into a polymerization reaction zone containing an olefin monomer. In addition, an ionizing agent or cocatalyst such as alumoxane may be introduced into the reaction zone. Further, the catalyst may also be pre-polymerized prior to introducing it into the reaction zone and/or prior to the stabilization of reaction conditions in the reactor.

BRIEF DESCRIPTION OF THE DRAWINGS

A more complete appreciation of the invention and many of the attendant advantages thereof will be readily understood by reference to the following detailed description when considered in connection with the accompanying drawings wherein.

DETAILED DESCRIPTION OF THE INVENTION

Figure 1B:
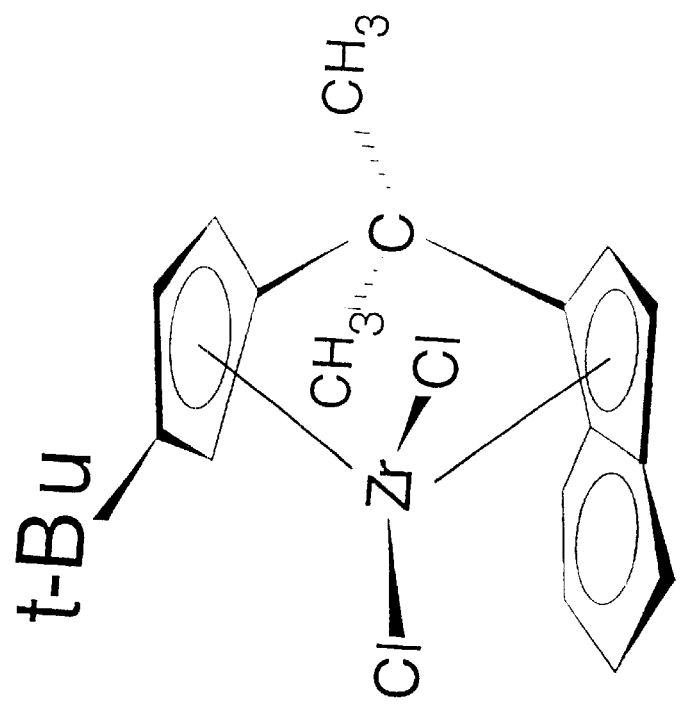
FIG. 1 shows the structures of the catalyst precursors isopropylidene[3-t-butylcyclopentadienyl-1-indenyl] zirconium dichloride [Me$_2$C(t-buCp)(Ind)ZrCl$_2$].

The present invention provides a catalyst and process for the production of polyolefins, particularly polyethylene and polypropylene having low molecular weight.

When propylene or other alpha-olefins are polymerized using a catalyst consisting of a conventional Ziegler-Natta transition metal catalyst, the polymer product typically comprises a mixture of amorphous atactic and crystalline xylene insoluble fractions. The crystalline fraction may contain a mixture of both isotactic and syndiotactic chains. Highly isospecific metallocene catalysts are disclosed in European Patent Application Publication No. 284,708 corresponding to U.S. patent application Ser. No. 034,472 filed Apr. 3, 1987, and now abandoned; U.S. Pat. No. 4,794,096; and European Patent Application Publication No. 310,734 corresponding to U.S. patent application Ser. No. 095,755 filed on Sep. 11, 1987, and now abandoned.

It is also known in the literature that different stereoisomers of a given metallocene produce polymers of different stereochemistry. Thus, for example, the meso-isomer of ethylene bisindenylzirconium dichloride produces atactic polypropylene whereas the racemic-isomer of the same metallocene produces isotactic polymer (see W. Kaminsky, K. Kulper, H. H. Brintzinger, F. R. Wild. Angew. Chem., Int. Ed. Engl., 1985, 24, 507; for titanium analog see J. A. Ewen. J. Am. Chem. Soc. 1984, 106, 6355). It is also known in the literature that different regioisomers of a given metallocene may produce polymers of different stereochemistry also. Thus for example, racemic bridged bis(3-methylindenyl) zirconium dichloride produces atactic polypropylene (see J. A. Ewen, L. Haspeslagh, M. J. Elder, J. L. Atwood, H. Zhang, H. N. Cheng, in Transition Metals and Organometallics as catalysts for Olefin Polymerization., Eds., W. Kaminsky, H. Sinn., Springer, Berlin, 1988., p281 and W. Spaleck, F. Kuber, A. Winter, J. Rohrmann, B. Bachmann, M. Antberg, V. Dolle, E. F. Paulus, Organometallics. 1994, 13, 954). It was also shown recently that formation of rotational isomers of an unbridged metallocene during chain propagation produces polymers of different stereochemistry (G. W. Coates, R. M. Waymouth. Science. 1995, 267, 217). The catalysts of the present invention exists as two or four stereoisomers, more appropriately referred to as diastereomers, which upon separation polymerize propylene to produce either atactic or isotactic polypropylene of low molecular weight as will be shown in more detail in later sections. In the present invention both the diastereoisomers are also chiral.

The metallocene catalysts of the present invention may be described by the formula $$R''(C_5R_4)(R'_2C_5C_4R'_4)MeQ_p$$

wherein (C$_5$R$_4$) is a substituted cyclopentadienyl ring; (R'$_2$C$_5$C$_4$R'$_4$) is an indenyl ring, substituted or unsubstituted; each R and R' is hydrogen or hydrocarbyl radical having from 1–20 carbon atoms, a halogen, an alkoxy, and alkoxy alkyl or an alkylamino radical, each R and R' may be the same or different; (C$_5$R$_4$) has one R substituent in a distal position which is at least as bulky as a t-butyl radical; R" is a structural bridge between the (C$_5$R$_4$) and (R'$_2$C$_5$C$_4$R'$_4$) rings to impart stereorigidity and, preferably, is a hydrocarbyl or hydrosilyl radical having one carbon or silicon atom to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; and p is the valence of Me minus 2. In this description of the metallocene compound or catalyst precursor, "distal" means located in a position most distant from the bridgehead carbon as illustrated by positions 3 and 4 (1 being the position of the bridgehead carbon) in the diagram below:

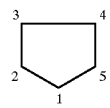

"Bulky" is related to spatial displacement and in this invention means, preferably, having a spatial displacement equal to or greater than a t-butyl group (CH$_3$)$_3$C group.

The metallocene compound or catalyst precursor is stereorigid, chiral and may or may not have bilateral symmetry. Stereorigidity is imparted to prevent rotation of the cyclopentadienyl rings about their coordination axes and may be obtained by several ways. Stereorigidity may be obtained by substituted cyclopentadienyl rings in which the substituent groups provide steric hindrance by nonbonded spatial interaction between the substituted cyclopentadienyl rings or by virtue of the bulk of the substituent groups. Stereorigidity may also be obtained by the cyclopentadienyl rings being in a state of low kinetic energy. Stereorigidity may be obtained by means of a structural bridge between the cyclopentadienyl rings which connects them and fixes their location relative to one another.

An illustration of the ligands of isopropylidene[(3-t-butylcyclopentadienyl)(indenyl]zirconium dichloride [Me$_2$C(t-buCp)(Ind) ZrCl$_2$] is shown below:

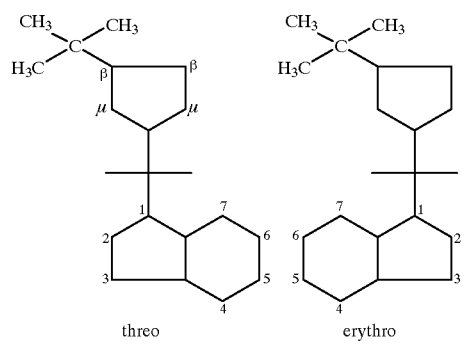

threo                    erythro

The α and β position of the cyclopentadienyl ring represent the position of possible substituents in the proximal and distal position, respectively. The numerical positions of the indenyl ring represent the position of possible substituents on the indenyl ring, 1 being the position of the bridge.

An examination of the model of this metallocene shows that the t-butyl group may be positioned in close proximity to the phenyl ring of indene, or away from the phenyl group of indene as shown in the illustration above. In the former case, the diastereomer is called an erythro-isomer and in the latter case the isomer is called a threo-isomer.

In a preferred catalyst of the present invention, $(C_5R_4)$ is preferably a substituted cyclopentadienyl ring in which one R substituent is in the distal position and is at least as bulky at a t-butyl radical and the other R are hydrogen; $(R'_2C_5C_4R'_4)$ may comprise hydrocarbyl radicals attached to a single carbon atom in the cyclopentadienyl ring as well as radicals that are bonded to two carbon atoms in the ring to form a fused ring and is preferably an unsubstituted indenyl radical; Me is preferably a Group IVB metal, such as titanium, zirconium or hafnium, more preferably. zirconium or hafnium and most preferably zirconium; Q is preferably a halogen and is most preferably chlorine; p may vary with the valence of the metal atom but is preferably 2; and R" is preferably a hydrocarbyl radical or hydrosilyl having one atom coordinated with $(C_5R_4)$ and with $(R'_2C_5C_4R'_4)$ acting as a bridge between the two cyclopentadienyl rings, e.g., an unsubstituted isopropylidene or phenylmethylsilyl radical.

Other exemplary hydrocarbyl radicals for the structural bridge include methyl, ethyl, propyl, butyl, pentyl, hexyl, heptyl, octyl, nonyl, decyl, and the like, which may be substituted or unsubstituted. Other hydrocarbyl radicals useful as the structural bridge in the present catalysts include unsubstituted (linear) alkyl radicals of 1–10 carbon atoms or substituted (branched) radicals of 2–20 carbon atoms. If the bridge has differing substituents on the bridging component, there may be four diastereomers of the metallocene compound instead of only two.

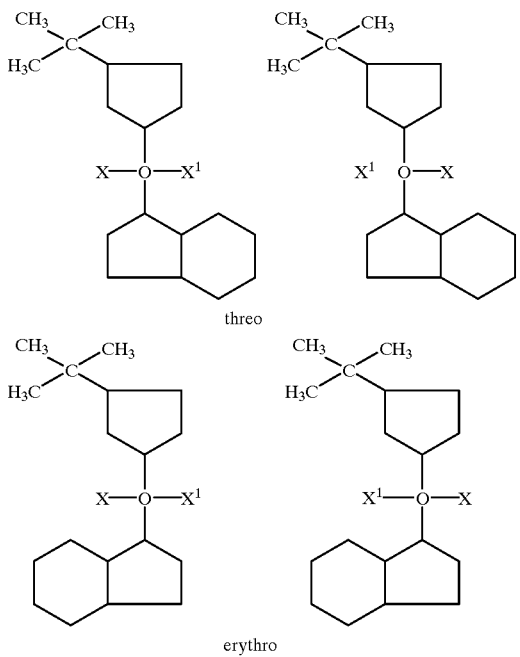

Figure 1A:
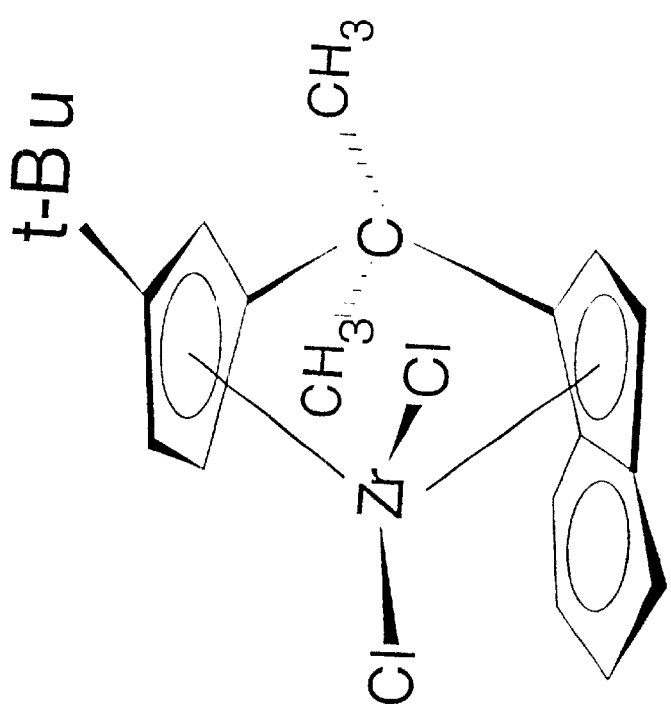
Figure 2:
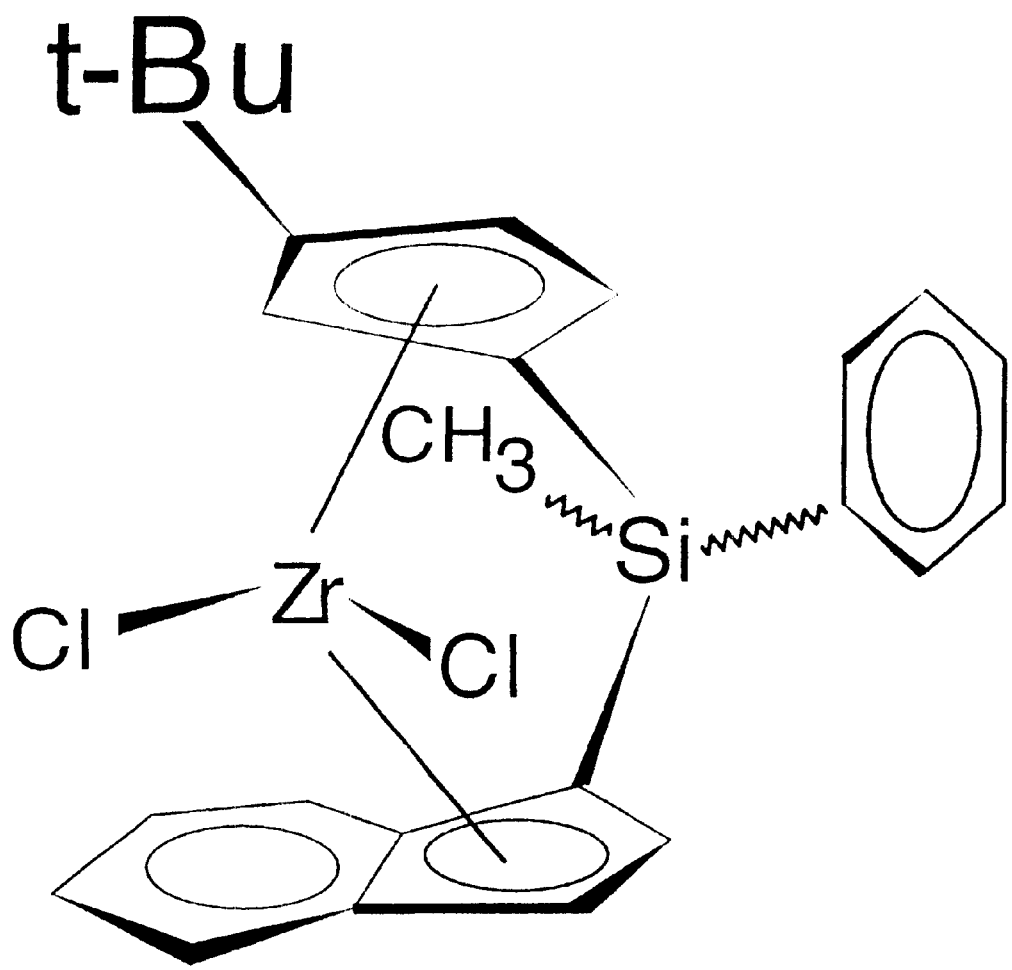
FIG. 2 shows the structure of a catalyst precursor methylphenylsilylidene[3-t-butylcyclopentadienyl-1-indenyl]zirconium dichloride [Me(Ph)Si(t-buCp)(Ind) ZrCl$_2$].

FIGS. 1 and 2 show the structure of a preferred catalyst precursors isopropylidene[3-t-butylcyclopentadienyl-1-indenyl]zirconium dichloride [Me$_2$C(t-buCp)(Ind) ZrCl$_2$] and methylphenylsilylidene[3-t-butylcyclopentadienyl-1-indenyl]zirconium dichloride [Me(Ph)Si(t-buCp)(Ind) ZrCl$_2$].

The catalyst precursor may be prepared by any method known in the art. Generally, the preparation of the catalyst complex consists of forming and isolating the Cp or substituted Cp ligands which are then reacted with a halogenated metal to form the complex.

The metallocene catalysts of the present invention are useful in many of the polymerization processes known in the art including many of those disclosed for the preparation of polyethylene and polypropylene. When the catalysts of the present invention are used in these types of processes, the processes produce crystalline or atactic polymers.

When hydrogen is used to control molecular weight of the polymer, the olefinic chain ends will be hydrogenated. As a result, the polymer would be useful in applications which require fully saturated crystalline waxes. However, if the polymer molecular weight is controlled by process conditions such as polymerization temperature, metallocene structure or cocatalyst type, composition and conditions, the resulting polymer would have olefinic chain ends which can be functionalized further via chemical reactions.

Further examples of polymerization processes useful in the practice of the present invention include those disclosed in U.S. Pat. No. 4,767,735 and European Patent Application Publication No. 310,734 Corresponding to U.S. patent application Ser. No. 095,755 filed on Sep. 11, 1987, and now abandoned, the disclosures of which are hereby incorporated herein by reference. These preferred polymerization procedures include the step of prepolymerizing the catalyst and/or precontacting the catalyst with a cocatalyst and an olefin monomer prior to introducing the catalyst into a reaction zone.

The ionizing agent is an alumoxane or a Lewis acid alone or in combination with aluminum alkyl which will ionize a neutral metallocene compound to form a cationic metallocene catalyst. Examples of such ionizing agents are methyl alumoxane (MAO), tris(pentafluorophenyl)boron or triphenylcarbenium tetrakis(pentafluorophenyl)boronate alone or in combination with triethylaluminum (TEAl). Other ionizing agents are disclosed in U.S. patent application Ser. Nos. 07/419,057 and 07/419,222 and European Patent Publication Nos. 0-277-003 and 0-277-004 which are hereby incorporated by reference.

The catalysts of the present invention are particularly useful in combination with an aluminum cocatalyst, preferably an alumoxane. In addition, a complex may be isolated between a metallocene catalyst as described herein and an aluminum cocatalyst in accordance with the teachings of European Patent Publication Number 226,463 published on Jun. 24, 1987. As disclosed therein, a metallocene is reacted with an excess of alumoxane in the presence of a suitable solvent. A complex of the metallocene and alumoxane may be isolated and used as a catalyst in the present invention.

The alumoxanes useful in combination with the catalysts of the present invention, either in the polymerization reaction or in forming the complex disclosed above, may be represented by the general formula $(R-Al-O-)_n$ in the cyclic form and $R(R-Al-O-)_n ALR_2$ in the linear form wherein R is an alkyl group with one to five carbon atoms and n is an integer from 1 to about 20. Most preferably, R is a methyl group and the preferred alumoxane is methylalumoxane (MAO). The alumoxanes can be represented structurally as follows:

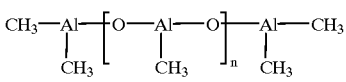

n = 15–20

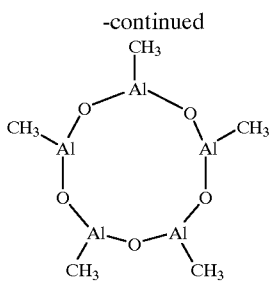

The alumoxanes can be prepared by various methods known in the art. Preferably, they are prepared by contacting water with a solution of trialkyl aluminum, such as, trimethyl aluminum, in a suitable solvent such as a benzene. Another preferred method includes the preparation of alumoxane in the presence of a hydrated copper sulfate as described in the U.S. Pat. No. 4,404,344 the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art.

The process of the present invention is effective for any known polymerization reaction conditions for olefin polymerization in which metallocene catalysts are used. The polymerization temperature is preferably from −20° C. to 90° C., more preferably 50° C. to 80° C., most preferably about 60° C. The polymerization pressure is preferably 25 psig to 600 psig, more preferably 100 psig to 500 psig, most preferably about 350 psig.

The polymerization process may be either slurry, bulk or gas phase. The selection of the particular process will effect the operative and optimum reaction conditions. The preferable process for the present invention is bulk or slurry, more preferably bulk.

The Examples given below illustrate the present invention and its various advantages and benefits in more detail. The synthesis procedure was performed under an inert gas atmosphere using a Vacuum Atmospheres glovebox or Schlenk techniques. The synthesis process generally comprises the steps of (1) preparing the halogenated or alkylated metal compound, (2) preparing the ligand, (3) synthesizing the complex, and (4) purifying the complex. The particular catalysts produced by these methods are isopropylidene[3-t-butylcyclopentadienyl-1-indenyl]zirconium dichloride [Me$_2$C(t-buCp)(Ind)ZrCl$_2$] and methylphenylsilylidene[3-t-butylcyclopentadienyl-1-indenyl]zirconium dichloride [Me(Ph)Si(t-buCp)(Ind) ZrCl$_2$].

The invention having been generally described, the following examples are given as particular embodiments of the invention and to demonstrate the practice and advantages thereof. It is understood that the examples are given by way of illustration and are not intended to limit the specification or the claims to follow in any manner.

SYNTHESIS OF THE CATALYST

The synthesis of isopropylidene(t-butylcyclopentadienyl)(indenyl)ZrCl$_2$ was achieved in the following stages.

3-tert-Butyl-6.6-Dimethylfulvene

Into a 200 ml, 3-neck flask, equipped with a reflux condenser, a gas inlet tube and a magnetic stirring bar, was charged, under nitrogen, 2 grams t-butylcyclopentadienyl lithium and 25 ml anhydrous tetrahydrofuran (THF). The solution was cooled in an ice-bath and 10 ml acetone, dried over 3A, was cautiously added. The reaction mixture was allowed stir overnight and quenched, cautiously, with 60 ml water. The resulting solution was extracted with ethyl ether using the standard lab extraction procedure. The resulting yellow oil was distilled under vacuum at 40–45° C. to obtain a clear yellow oil, 0.76 g.

2-(3-tert-Butylcyclopentadienyl)-2-indenyl isopropylidene

Under nitrogen, 0.6 g of indenyllithium was charged into a 100 ml flask equipped with a pressure equalized funnel, a side arm with a 3-way stopcock and a magnetic stirrer. Anhydrous THF (15 ml) was added to the flask with stirring and cooled to 0° C. A solution of 0.76 g the fulvene, prepared in the previous step, dissolved in 15 ml THF was charged into the addition funnel. The fulvene solution was added dropwise over 50 min. The reaction mixture was allowed to stir overnight at 15–20° C. The flask was cooled in an ice-bath and the reaction mixture was quenched with water. The resulting solution was extracted with ether to obtain a dark-brown liquid. The liquid was subjected to vacuum distillation at 55–80° C., to remove traces of unreacted fulvene and the resulting oily residue was passed through a short silica gel column elution with pentane yielded 0.61 g of a yellow oil.

i-Pr(t-BuCp)(Ind)ZrCl$_2$

To an ice cold solution of 0.61 g of the ligand, prepared in the preceding step, in 15 ml freshly distilled (from benzophenone ketyl) ether taken in a one-neck flask equipped with a side arm consisting of a 3-way stopcock, 3.2 ml methyllithium lithium (1.4 M) solution in ether was added. After 30 min stirring at 0° C., the ice bath was removed and reaction mixture was stirred for 5 hours. The stirring was stopped and the yellow orange precipitate was allowed to settle for 10 min. Anhydrous hexane was (5 ml) was added and the supernatant was removed with a cannula. The solid was washed with two baths of fresh, dry hexane and the remaining solid were removed with a cannula. A fresh portion of hexane (10 ml) added and stirred. Into this suspension, was added a slurry of 0.51 g of ZrCl$_4$ in hexane (8 ml) and the resulting suspension was stirred overnight. The stirring was stopped and the supernatant was removed with a cannula. The remaining solid was washed with three portions of dry hexane and the solid was dried under vacuum.

A portion of the solid from the reaction was dissolved in anhydrous, hot (50–55° C.) toluene and the hot solution was filtered. The residual solid was extracted with two small portions dry toluene. The solvent from the combined extracts was removed under vacuum with warming. The resulting isomer mixture was used for polymerizations in Examples 1–2 and Example 5.

The yellow to orange solid from the above purification procedure was charged under nitrogen into a micro Soxhlet extraction apparatus and the solid was extracted with refluxing hexane under inert atmosphere. The orange solid precipitated from hot hexane was isolated and found (by $^1$H NMR) to be a single isomer (see threo-isomer of FIG. 1). The pure isomer was used in polymerizations described in Examples 3–4. The pure isomer was also obtained in improved yields by recrystallizing the isomer mixture from methylene chloride and hexane mixtures.

(Ph)(Me)Si(t-BuCp)(Ind)ZrCl$_2$

A dry, three necked flask equipped with a pressure equalized funnel, gas-inlet tube, rubber septa and a stirring bar was assembled in a dry box and charged with a THF (30 ml) solution of dichloromethylphenylsilane (2.74 ml, 3.2 g). The stirred solution was cooled to −84° C.(ethyl acetate/liquid $N_2$) and an ice-cold THF solution (30 ml) of indenyl lithium (1.77 g) was added dropwise over a period of 30–40 min. The temperature was gradually raised to room temperature and stirred at this temperature for 3 days. The resulting solution was cooled to 0° C., and a THF (15 ml) solution of t-butylcyclopentadienyl lithium (t-BuCpLi) (1.9 g) was added to the addition funnel. The t-BuCpLi solution was added dropwise to the reaction mixture to obtain a clear red solution. The solution was allowed to stir overnight at room temperature. The solvent from the resulting purple solution was removed under vacuum to obtain a light, red-purple tar. To the tarry material, hexane (80 ml) was added followed by enough dry ether (approx. 30 ml) such that all the tarry material became suspended in the solvent mixture. To this suspension, a slurry of zirconium tetrachloride (3.37 g) in hexane (20 ml) was added with stirring. The reaction color changed to orange red. The reaction mixture was stirred at room temperature overnight. The stirring was stopped; the solids were allowed to settle and the supernatant was decanted with a cannula. Dry toluene (130 ml) was added and filtered under inert atmosphere. Toluene was removed from the filtrate under vacuum with slight heating to obtain a dark reddish orange tar. Dry hexane was added to the residue and stirred at 40–45° C. until all the tarry material changed to suspended solid. The hexane was decanted and the remaining solid was dried under vacuum. A sample of this LiCl-free, purified material was used in the polymerizations below.

POLYMERIZATION

Example 1

The polymerization was performed in a 2 liter, magnedrive, packless Zipperclave reactor. A solution of 10 mg the isomeric mixture of i-Pr(t-BuCp)(Ind)ZrCl$_2$ in 5 ml MAO solution in toluene (10% MAO by weight) was placed in a stainless steel bomb and charged along with 400 ml propylene into the reactor containing 1 liter propylene at room temperature. The stirring was started and the temperature was raised to 60° C. The polymerization was performed at this temperature for 32 minutes at which time the polymerization temperature could not be controlled efficiently. The polymerization was terminated by venting the monomer. The reactor was opened and the polymer was collected. The polymer was dried in a vacuum oven kept at 50° C. The polymer yield was 370 grams. The results of polymer analysis are given in Table 1.

The polymer mixture (100 grams) was suspended in 500 ml heptane and heated to 90° C. and stirred until all the polymer dissolved. The stirring was stopped and the solution was allowed to cool to room temperature and the precipitated isotactic polymer was filtered. The solvent from the filtrate was evaporated to obtain the atactic polymer.

Molecular weight distribution (MWD) can be represented as the ratio of the weight average molecular weight ($M_w$) to the number average molecular weight ($M_n$): MWD=$M_w/M_n$. This ratio is also known as polydispersity (D).

Example 2

The polymerization procedure in the Example 1 was repeated with 2.5 g the metallocene isomer mixture and 2.5 ml MAO solution and the polymerization temperature was maintained at 45° C. The polymerization was allowed to continue for 60 minutes at which time the reaction was terminated. The polymer yield was 95 grams. The results of polymer analysis are given in Table 1.

Example 3

The polymerization described in Example 1 was repeated with 2 mg of purified i-Pr(t-BuCp)(Ind)ZrCl$_2$ Consisting of a single isomer and 2.5 ml MAO solution. The polymerization time was one hour. The polymer yield was 134 grams of isotactic polypropylene. The results of polymer analysis are given in Table 1.

Example 4

The procedure described in Example 1 was repeated with 2 mg of purified i-Pr(t-BuCp)(Ind)ZrCl$_2$ and 2.5 ml MAO. The polymerization time was one hour. The polymer yield was 12 grams of isotactic polypropylene. The results of polymer analysis are given in Table 1.

Example 5

A 4-Liter Autoclave was charged with 925 grams hexane and heated to 80° C. A mixture of hydrogen and ethylene at a volume ratio of 0.25 ($H_2/C_2H_4$) was passed through the solvent at 10 ml/min. A catalyst delivery bomb was charged with 10 mg i-Pr(t-BuCp)(Ind)ZrCl$_2$ (single isomer component) and 10 ml 10%MAO solution in toluene. The catalyst bomb was connected to the reactor and the catalyst was charged into the reactor along with 375 g pressurized hexane. The polymerization was allowed to take place at 80° C. for one hour at an agitation rate of 600 rpm. At the end of this period, the monomer supply was stopped, the reactor pressure was released by venting and the polymer slurry was collected in a flask. The solvent was removed under vacuum in a rotary evaporator and dried in a vacuum oven. The polymer yield was 210 g. The results of polymer analysis are given in Table 1.

Example 6

The polymerization procedure was same as that described in Example 1 except that 10 mg purified (Me)Ph)Si(t-BuCp)(Ind)ZrCl$_2$ and 5 ml MAO was used. The polymerization period was one hour. The polymer yield was 100 grams. The results of polymer analysis are presented in Table 1.

The polymer mixture (25 grams) was suspended in 125 ml heptane and heated to 90° C. and stirred until all the polymer dissolved. The stirring was stopped and the solution was allowed to cool to room temperature and the precipitated isotactic polymer was filtered. The solvent from the filtrate was evaporated to obtain the atactic polymer.

Example 7

The procedure described in Example 6 was repeated with 10 mg purified (Me)Ph)Si(t-BuCp)(Ind)ZrCl$_2$ and 5 ml MAO. The polymerization time was one hour. The polymer yield was 40 grams. The results of polymer analysis are presented in Table 1.

TABLE 1

Propylene Polymerizations with Substituted Cyclopentadienyl Indenyl zirconium dichloride Type Isospecific Metallocenes

| Ex | Monomer | Cat. type | Cat mg | MAO (ml) Note 1 | Rxn. Temp (° C.) | Rxn. Time (min) | Yield (g) | Cat. Eff. | aPP (g) | iPP (g) | $M_w$ | $M_n$ | D | $T_m$ ° C. Note 3 | $T_c$ ° C. Note 3 | C=C ends per 1000 C | % meso dyad Note 2 | Comments |
|---|---|---|---|---|---|---|---|---|---|---|---|---|---|---|---|---|---|---|
| \multicolumn{19}{c}{Polymerizations with $Me_2C$(t-Bu-Cp)(Ind)$ZrCl_2$} |
| 1 | $C_3$ | Mixed Isomer | 10 | 5 | 60 | 32 | 370 | 69400 | 230 | 140 | 4089 | 2370 | 1.5 | 130.9 | 98.9 | 0.16 | 76.6 | |
| 2 | $C_3$ | Mixed Isomer | 5 | 2.5 | 45 | 60 | 95 | 19000 | 52 | 43 | 5957 | 3360 | 1.8 | 130.3 | 98.2 | 0.65 | 80.6 | |
| 3 | $C_3$ | Single Isomer | 2 | 2.5 | 60 | 60 | 134 | 67000 | — | 134 | 4039 | 2483 | 1.6 | 130.8 | 95.9 | 0.13 | 87.9 | Catalyst Purified by Soxhlet Ext. Orange crystals |
| 4 | $C_3$ | Single Isomer | 2 | 2.5 | 45 | 60 | 12 | 4800 | — | 12 | 5810 | 3203 | 1.8 | 132.2 | 95.8 | n.d | n.d | Same as above |
| 5 | $C_2$ | Single Isomer | 10 | 5 | 80 | 60 | 210 | 21000 | — | — | 2711 | 1827 | 1.5 | 100.0 116.2 | 99.5 | 0.07 | — | |
| \multicolumn{19}{c}{Polymerizations with $Me(Ph)Si$(t-Bu-Cp)(Ind)$ZrCl_2$} |
| 6 | $C_3$ | Mixed Isomer | 10 | 5 | 60 | 60 | 100 | 20000 | 29 | 71 | 8058 (mix) 11147 (iPP) 2254 (aPP) | 2101 (mix) 2389 (iPP) 1164 (aPP) | 3.9 (mix) 4.67 (iPP) 1.94 (aPP) | 125.2 | 90.7 | 1.8 | 84 | Catalyst Purified by toluene extraction followed by hexane wash |
| 7 | $C_3$ | Mixed Isomer | 10 | 5 | 45 | 60 | 40 | 8000 | 11 | 29 | 8943 (mix) 2683 (iPP) 2925 (aPP) | 2555 (mix) 9632 (iPP) 1180 (aPP) | 3.5 (mix) 3.59 (iPP) 2.48 (aPP) | 125.4 | 94.6 88 | 1.3 | 78 | Same as above |

Note 1: The concentration of MAO was 10% (by weight) in toluene solution
Note 2: From $^{13}C$ NMR
Note 3: Melting point ($T_m$) and crystallization temperature ($T_c$) from DSC (Differential Scanning Calorimetry) for iPP
Abbreviations:
n.d = not determined;
aPP = atactic polypropylene;
iPP = isotactic polypropylene Regarding the relationship between stereochemistry of the complexes and the polymer product, the i-Pr(t-BuCp) (Ind)$ZrCl_2$ exists as two stereoisomers, namely threo- and erythro- isomers, depending upon the spatial position of t-butyl groups with respect the phenyl ring of the indenyl group (FIG. 1). Purification methods allowed isolation of one isomer, presumably the threo-isomer, which polymerized propylene to give isotactic polypropylene. Variable temperature (−30 to 130° C.) $^1H$-NMR in 1,1,2,2-tetrachloroethane did not suggest interconversion of the two isomers. The results show that the mixture of isomers produces a mixture of isotactic and atactic polypropylene. It is assumed that the other isomer, presumably the erythro-isomer, polymerizes propylene to produce atactic polypropylene.

The composition of (Me)(Ph)Si(t-BuCp)(Ind)$ZrCl_2$ is even more complex due to the dissimilar groups on the silicon bridge and, based upon the structure, four racemic diastereomers are expected, as shown in the text above. The broad molecular weight distribution of the polymer products, which is contrary to the narrow molecular weight distribution expected for metallocene-produced polymers, suggests that different isomers produce polymer of different molecular weight as well as varied stereochemistry.

As shown in Examples 1 and 2, a mixture of threo- and erythro-isomers produce a mixture of atactic and crystalline (isotactic) polymers. When a single threo-isomer is used in polymerization, only crystalline (isotactic) polymer is produced, as shown in Examples 3–5. When the bridge has different substituents such that there are four possible diastereomers, the two threo-isomers produce a crystalline (isotactic) polymer with a broad molecular weight distribution, as shown in Examples 6 and 7. Generally, metallocene catalysts, which are single site catalysts, produce polymer having narrow molecular weight distribution. In theory, use of a single metallocene catalyst would produce a polymer with a molecular weight distribution of approximately 2. The present invention allows the use of a single metallocene catalyst having two threo-isomers to produce polymer having relative broad molecular weight distribution, i.e., greater than 2 and up to approximately 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A catalyst for producing polyolefins having a low molecular weight comprising:

a) a metallocene compound described by the formula

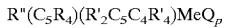

wherein ($C_5R_4$) is a substituted cyclopentadienyl ring; ($R'_2C_5C_4R'_4$) is an indenyl ring; each R is hydrogen or hydrocarbyl radical having from 1–20 carbon atoms, a halogen, an alkoxy, and alkoxy alkyl or an alkylamino radical, each R may be the same or different, and each R' is hydrogen; (C$_5$R$_4$) has one R substituent in a distal position which is at least as bulky as a t-butyl radical; R" is a structural bridge between the (C$_5$R$_4$) and (R'$_2$C$_5$C$_4$R'$_4$) rings to impart stereorigidity; Q is a hydrocarbyl radical having 1–20 carbon atoms or is a halogen; Me is a Group IVB metal as positioned in the Periodic Table of Elements; and p is the valence of Me minus 2;

b) an ionizing agent.

2. The catalyst of claim 1 wherein (C$_5$R$_4$) is a substituted cyclopentadienyl radical which has one R substituent in a distal position which is a t-butyl radical.

3. The catalyst of claim 1 wherein Me is titanium, zirconium or hafnium.

4. The catalyst of claim 1 wherein R" is selected from the group consisting of an alkylene radical having 1–4 carbon atoms.

5. The catalyst of claim 1 wherein R" is a hydrocarbyl or hydrosilyl radical.

6. The catalyst of claim 1 wherein R"(C$_5$R$_4$)(R'$_2$C$_5$C$_4$R'$_4$) is an isopropylidene[3-t-butylcyclopentadienyl-1-indenyl] or a methylphenylsilylidene[3-t-butylcyclopentadienyl-1-indenyl] radical.

7. The catalyst of claim 1 wherein the ionizing agent is an alumoxane or a Lewis acid alone or in combination with aluminum alkyl which will ionize a neutral metallocene compound to form a cationic metallocene catalyst.

8. The catalyst of claim 1 wherein the ionizing agents are methylalumoxane, tris(pentafluorophenyl)boron, triphenylcarbenium tetrakis(pentafluorophenyl)boronate, tris(pentafluorophenyl)boron in combination with triethylaluminum or triphenylcarbenium tetrakis(pentafluorophenyl)boronate in combination with triethylaluminum.

9. The catalyst of claim 1 wherein the catalyst is prepolymerized by contacting the catalyst with an olefin monomer.

10. A catalyst for producing crystalline polyolefins having a low molecular weight comprising:

a) a metallocene catalyst comprising a single threo-isomer of a metallocene compound described by the formula

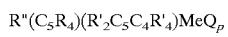

wherein (C$_5$R$_4$) is a substituted cyclopentadienyl ring; (R'$_2$C$_5$C$_4$R'$_4$) is indenyl; each R is hydrogen or hydrocarbyl radical having from 1–20 carbon atoms, a halogen, an alkoxy, and alkoxy alkyl or an alkylamino radical, each R may be the same or different and R' is hydrogen; (C$_5$R$_4$) has one R substituent in a distal position which is at least as bulky as a t-butyl radical; R" is a structural bridge between the (C$_5$R$_4$) and (R'$_2$C$_5$C$_4$R'$_4$) rings to impart stereorigidity; Q is a hydrocarbyl radical having 1–20 carbon atoms or is a halogen; Me is a Group IVB metal as positioned in the Periodic Table of Elements; and p is the valence of Me minus 2;

b) an ionizing agent.

11. A catalyst for producing atactic polyolefins having a low molecular weight comprising:

a) a metallocene catalyst comprising a single erythro-isomer of a metallocene compound described by the formula

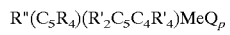

wherein (C$_5$R$_4$) is a substituted cyclopentadienyl ring; (R'$_2$C$_5$C$_4$R'$_4$) is indenyl; each R is hydrogen or hydrocarbyl radical having from 1–20 carbon atoms, a halogen, an alkoxy, and alkoxy alkyl or an alkylamino radical, each R may be the same or different and R' is hydrogen; (C$_5$R$_4$) has one R substituent in a distal position which is at least as bulky as a t-butyl radical; R" is a structural bridge between the (C$_5$R$_4$) and (R'$_2$C$_5$C$_4$R'$_4$) rings to impart stereorigidity; Q is a hydrocarbyl radical having 1–20 carbon atoms or is a halogen; Me is a Group IVB metal as positioned in the Periodic Table of Elements; and p is the valence of Me minus 2;

b) an ionizing agent.

12. A catalyst for producing polyolefins having broad molecular weight distribution comprising:

a) a metallocene catalyst comprising the threo-isomers of the metallocene compound having four diastereomers described by the formula

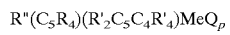

wherein (C$_5$R$_4$) is a substituted cyclopentadienyl ring; (R'$_2$C$_5$C$_4$R'$_4$) is indenyl; each R is hydrogen or hydrocarbyl radical having from 1–20 carbon atoms, a halogen, an alkoxy, and alkoxy alkyl or an alkylamino radical, each R may be the same or different and R' is hydrogen; (C$_5$R$_4$) has one R substituent in a distal position which is at least as bulky as a t-butyl radical; R" is a substituted structural bridge between the (C$_5$R$_4$) and (R'$_2$C$_5$C$_4$R'$_4$) rings to impart stereorigidity and has differing substituents; Q is a hydrocarbyl radical having 1–20 carbon atoms or is a halogen; Me is a Group IVB metal as positioned in the Periodic Table of Elements; and p is the valence of Me minus 2;

b) an ionizing agent.

\* \* \* \* \*